US011848923B2

(12) United States Patent
MacDonald et al.

(10) Patent No.: US 11,848,923 B2
(45) Date of Patent: Dec. 19, 2023

(54) SECURE PEER-TO-PEER CONNECTION NETWORK AND ASSOCIATED PROTOCOLS FOR A GROUP-BASED COMMUNICATION SYSTEM

(71) Applicant: Salesforce, Inc., San Francisco, CA (US)

(72) Inventors: Andrew MacDonald, San Francisco, CA (US); Mark Christian, Oakland, CA (US)

(73) Assignee: Salesforce, Inc., San Francisco, CA (US)

( * ) Notice: Subject to any disclaimer, the term of this patent is extended or adjusted under 35 U.S.C. 154(b) by 166 days.

(21) Appl. No.: 17/156,945

(22) Filed: Jan. 25, 2021

(65) Prior Publication Data

US 2021/0234847 A1 Jul. 29, 2021

Related U.S. Application Data

(60) Provisional application No. 62/966,509, filed on Jan. 27, 2020.

(51) Int. Cl.
*H04L 29/06* (2006.01)
*H04L 9/40* (2022.01)

(52) U.S. Cl.
CPC ........ *H04L 63/065* (2013.01); *H04L 63/0807* (2013.01); *H04L 63/0876* (2013.01); *H04L 63/104* (2013.01)

(58) Field of Classification Search
CPC .............. H04L 63/065; H04L 63/0807; H04L 63/0876; H04L 63/104; H04L 63/0435; H04L 2463/061; H04L 67/104
See application file for complete search history.

(56) References Cited

U.S. PATENT DOCUMENTS

| 8,935,759 B2 * | 1/2015 | Weizman ................ H04L 67/00 726/28 |
| 8,935,760 B2 * | 1/2015 | Weizman ............ H04L 61/2575 726/28 |
| 9,860,326 B2 * | 1/2018 | Eliáš ...................... H04L 67/51 |

(Continued)

OTHER PUBLICATIONS

David Auerbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.

(Continued)

*Primary Examiner* — Khalid M Almaghayreh
(74) *Attorney, Agent, or Firm* — Lee & Hayes, P.C.

(57) ABSTRACT

Secure peer-to-peer connection network and/or protocols for a group-based communication system, in which, a peer-to-peer connection request associated with a first identifier for a first client device and a second identifier for a second client device are received. The first identifier and the second identifier are compared to a group-based communication system validation registry associated with the group-based communication system and, based at least in part on a determination that the peer-to-peer connection request is authorized per the group-based communication system validation registry, a peer-to-peer connection between the second client device and the first client device is established.

20 Claims, 5 Drawing Sheets

(56) References Cited

U.S. PATENT DOCUMENTS

| | | | | |
|---|---|---|---|---|
| 10,715,989 | B2* | 7/2020 | Vallabhu | G06F 9/44 |
| 2004/0064512 | A1* | 4/2004 | Arora | H04L 63/08 |
| | | | | 709/206 |
| 2007/0118875 | A1* | 5/2007 | Chow | H04L 63/0846 |
| | | | | 726/2 |
| 2013/0125224 | A1* | 5/2013 | Kaufman | H04W 4/21 |
| | | | | 726/7 |
| 2013/0170500 | A1* | 7/2013 | Nishida | H04L 67/1074 |
| | | | | 370/401 |
| 2014/0349669 | A1* | 11/2014 | Qi | H04W 16/14 |
| | | | | 455/454 |
| 2015/0134843 | A1* | 5/2015 | Hsieh | H04L 61/2589 |
| | | | | 709/228 |
| 2018/0197144 | A1* | 7/2018 | Frank | H04L 63/104 |
| 2018/0287982 | A1 | 10/2018 | Draeger et al. | |
| 2019/0327220 | A1* | 10/2019 | Huber | H04L 63/18 |
| 2020/0404573 | A1* | 12/2020 | Athlur | H04L 47/125 |
| 2022/0286411 | A1* | 9/2022 | Montazeri | H04L 47/808 |
| 2022/0286529 | A1* | 9/2022 | Shortt | H04L 67/306 |

OTHER PUBLICATIONS

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.

"Die, Email, Die! A Flickr Cofounder Aims to Cut us All Some Slack", Readwriteweb, Lexisnexis, https://advance.lexis.com/api/permalink/33dd79e2-90f5-409d-ae27-5a2c7e86bf31/?context=1000516> (dated Aug. 14, 2013, 4:15 PM) 3 pages.

Robert Hof, "Stewart Butterfield on How Slack Became a $2.8 Billion Unicorn", FORBES, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.

Matthew Ingram, "Flickr co-founder launches Slack, an all-in-one messaging tool designed to kill email forever", GIGAOM, Lexisnexis, https://advance.lexis.com/api/permalink/0b676b7c-aec3-4560-861e-d030d1dd008c/?context=1000516, (dated Feb. 12, 2014, 7:03 PM), 3 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 21 pages.

Mike Issac, "Slack, a Start-Up With an App to Foster Business Collaboration, is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 3 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.

Matsumoto, T. et al., "Chocoa Communicator—A New Communication System Based on Awareness and Text Communications", Fujitsu Sci. Tech. J., 36, 2, (Dec. 2000) pp. 154-161.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Ernie Smith, "Picking Up The Slack", TEDIUM, [online][retrieved May 9, 2019]. Retrieved from the Internet: <URL: https://tedium.co/2017/10/17/irc-vs-slack-chat-history/> (dated Oct. 17, 2017) 8 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.

Jonathan Vanian, "Why these startups think chat apps are the next big thing in workplace collaboration", GIGAOM, Lexisnexis, https://advance.lexis.com/api/permalink/e83778c8-09c8-43aa-9ba0-88526283de69/?context=1000516, (dated Aug. 1, 2014, 5:45 PM) 4 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 3 pages.

* cited by examiner

SECURE PEER-TO-PEER CONNECTION NETWORK AND ASSOCIATED PROTOCOLS FOR A GROUP-BASED COMMUNICATION SYSTEM

PRIORITY

This application claims priority to U.S. Provisional Application No. 62/966,509, filed on Jan. 27, 2020, the entire contents of which are incorporated by reference herein.

BACKGROUND

Effective and efficient network usage across multiple computing devices is central to network efficiency of various distributed software applications. There are a number of deficiencies and problems associated with network usage of distributed software applications.

BRIEF DESCRIPTION OF THE FIGURES

The detailed description is described with reference to the accompanying figures.

DETAILED DESCRIPTION

Figure 1:
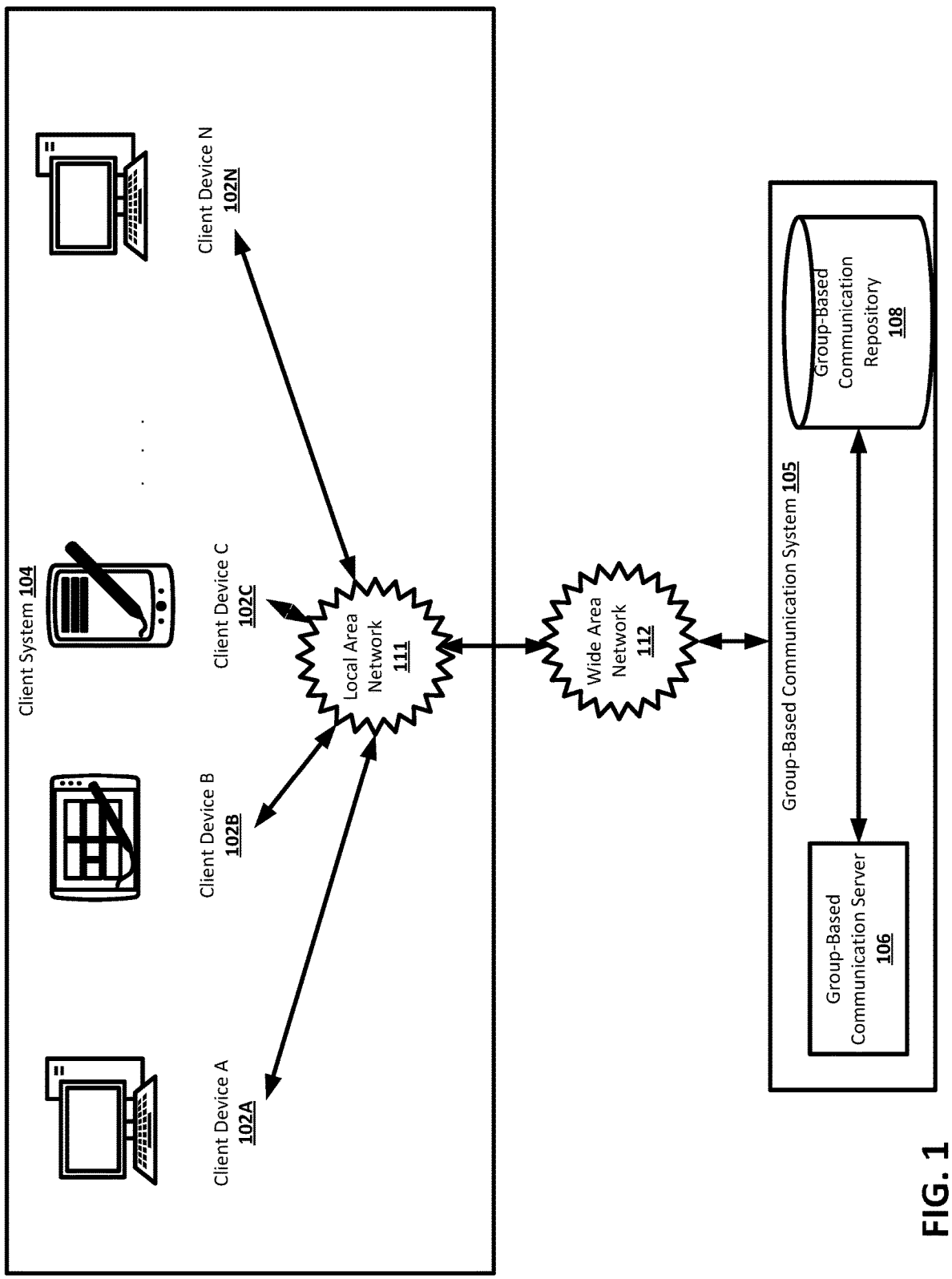
FIG. 1 depicts an example architecture for implementing some examples of the present disclosure.

Secure peer-to-peer connection network and/or protocols for a group-based communication system are described herein. In an example, techniques described herein are directed to facilitating secure peer-to-peer connections in a server system such as a group-based communication system. The group-based communication system may include a group-based communication server, a group-based communication repository, a plurality of group-based communication workspaces, and/or a plurality of group-based communication channels or other virtual spaces for group-based communication (e.g., direct messages, boards, and/or the like) that are accessible to a plurality of client devices. In at least one example, the group-based communication system can be associated with a communication platform, which, in some examples can be a group-based communication platform, a channel-based communication platform, a permission-based communication platform, channel-based messaging platform, and/or any other platform for facilitating communication between and among users.

In at least one example, a peer-to-peer connection, as used herein, can refer to a connection or communication link between two or more computing devices that are deemed to be equally privileged and/or equipotent according to the terms of a software application utilizing the peer-to-peer connection (e.g., between two or more computing devices that are both deemed client devices and/or that are both deemed server devices within a corresponding software).

In at least one example, techniques described herein relate to managing peer-to-peer connections among client devices of a group-based communication system. In an example, an apparatus can receive a peer-to-peer connection request, which can comprise a requesting client identifier associated with a first client device and a target client identifier associated with a second client device. In an example, the requesting client identifier and the target client identifier can be compared to a group-based communication system validation registry to determine if the peer-to-peer connection request is authorized. In an example where the peer-to-peer connection request is authorized, a peer-to-peer initiation instruction can be transmitted to the second client device, wherein the peer-to-peer initiation instruction can trigger establishment of a peer-to-peer connection between the second client device and the first client device for sharing group-based communication system data.

In some examples, client devices that are positioned closely together in a geographical sense (e.g., on the same floor of an office building) and/or which operate on the same local area network tend to access similar workspaces and group-based communication channels of the group-based communication system. This stands to reason as they often are working for the same organization, within similar teams (e.g., the engineering team, the marketing team, etc.), and are focused on similar tasks. In at least one example, such client devices can have similar or overlapping needs for group-based communication data (e.g., group-based communication channel data, file data, group-based communication application version data, etc.). The peer-to-peer connection triggering processes, systems, and protocols described herein serve these client device needs in a more efficient manner than conventional systems.

As described herein, a first client device can transmit, to a server of the group-based communication system, a peer-to-peer connection request that can identify a second client device. In at least one example, such a request can be transmitted via a validated WebSocket connection, which can help to ensure that client devices not associated with legitimate end-users of the group-based communication system are not be able to trigger establishment of the secure peer-to-peer connections discussed herein. Thus, receiving peer-to-peer connection requests through validated WebSocket connections maintained by the group-based communications system, as described herein, can provide an added layer of security to at least some of the peer-to-peer communication functionalities discussed herein.

While various examples of the present disclosure are described with reference to a group-based communication system, a person of ordinary skill in the relevant technology will recognize that the disclosed techniques can be utilized to establish secure peer-to-peer connections between client devices in any server system, such as any server system that enables end-users to interact with the server system using user profiles associated with the noted end-users. Indeed, the disclosure may be embodied in many different forms and should not be construed as limited to the examples set forth herein.

Peer-to-Peer Connections

Figure 5:
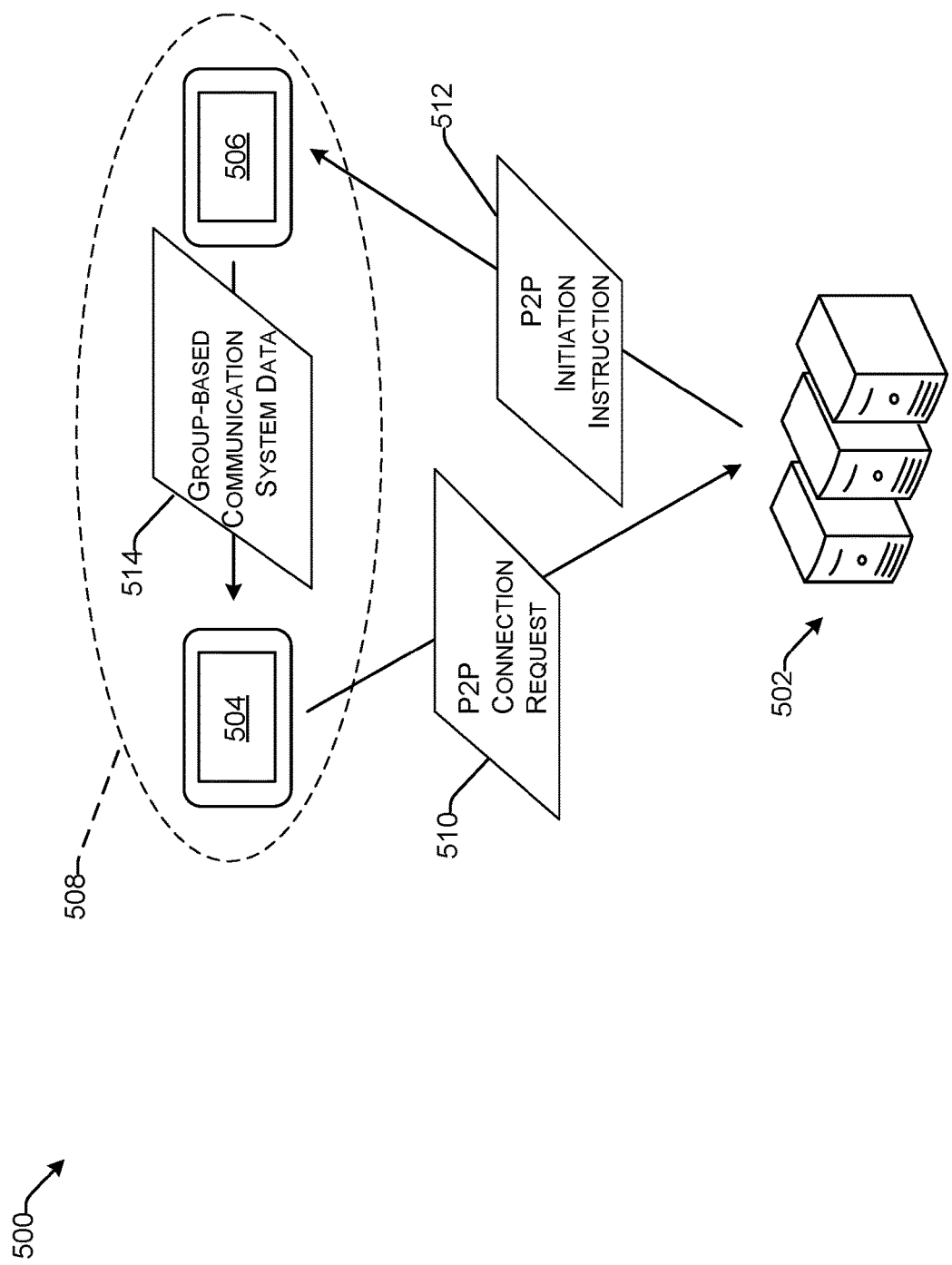
FIG. 5 illustrates an example environment for establishing peer-to-peer connections as described herein.

FIG. 5 illustrates an example environment 500 for establishing peer-to-peer connections as described herein. As described above, techniques described herein are directed to facilitating secure peer-to-peer connections in a server system such as a group-based communication system 502. The group-based communication system 502 may include a group-based communication server, a group-based communication repository, a plurality of group-based communication workspaces, and/or a plurality of group-based communication channels and/or other virtual spaces (e.g., direct messages, boards, etc.) that are accessible to a plurality of client devices. In at least one example, the group-based communication system 502 can be associated with a communication platform, which, in some examples can be a group-based communication platform, a channel-based communication platform, a permission-based communication platform, channel-based messaging platform, and/or any other platform for facilitating communication between and among users.

In some examples, a "group" can be associated with a "workspace" (e.g., a "group-based communication workspace"). As used herein, a "group" can refer to a group of users and a set of group-based communication objects all of which can be associated with a common group identifier. Thus, users sharing a group identifier also share group-based communication objects. In other words, users sharing a common group identifier that is also shared by a set of group-based communication objects may access those group-based communication objects to perform actions on those objects, such as viewing messages, posting messages, opening files, and the like. However, in some embodiments of a workspace, some group-based communication objects require that a group member have specific credentials or adequate permissions before the group-based communication object becomes accessible to the group member. As an example, private group-based communication channels are not generally accessible to all group members; instead, the private group-based communication channels are accessible to only a subset of group members. Similarly, certain files and other group-based communication objects, such as user accounts, are accessible to only a subset of the group members.

Group identifiers can be used to associate data, information, messages, etc., with specific groups. A group identifier, which can also be referred to as a "team identifier," can comprise one or more items of data by which a group within a group-based communication system may be identified. For example, a group identifier may comprise ASCII text, a pointer, a memory address, and the like. In at least one example, a group identifier can be a unique number. For example, in one example, the group identifier may be stored as a 64 bit unsigned integer and represented externally (outside of memory) as a base-34 encoded string.

In some examples, users of the group-based communication system 502 can be organized into groups. In some examples, each group can be associated with a single organization. In some examples, a group can be associated with two or more different organizations. In some examples, an organization can be associated with two or more groups. In some examples, users of the group-based communication system 502 can be organized into organization groups (e.g., employees of each company may be a separate organization group) and each organization group may have one or more group-based communication channels to which users may be assigned and/or which the users may join (e.g., group-based communication channels may represent departments, geographic locations such as offices, product lines, user interests, topics, issues, and/or the like). A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Two client devices are illustrated in FIG. 5. A first client device 504, which can be a "requesting client device," and a second client device 506, which can be a "target client device." While two client devices are shown, in some examples, any number of client devices can be associated with the example environment 500 described herein. As described below, peer-to-peer communication configurations among a number (n) of client devices can cause the creation of a mesh network.

In at least one example, a first client device 504, which can be associated with a first client identifier, and a second client device 506, which can be associated with a second client identifier, can be associated with a same group identifier. That is, the first client device 504 and the second client device 506 can be associated with a same group. In some examples, the first client device 504 and the second client device 506 can both have access to a local area network 508. Such a local area network can provide high bandwidth and low data communication latency based on Wi-Fi® or other local area network (LAN) protocols (e.g., have a roundtrip latency of less than twenty milliseconds and/or a bandwidth of greater than ten megabits per second). As such, peer-to-peer connections configured in accordance with techniques described herein offer low latency and high bandwidth connections for sharing group-based communication data within peer-connected client devices. In at least one example, the local area network 508 may be a computer network that interconnects computing devices within a limited area such as a residence, school, laboratory, university campus, or office building. Examples of peer-to-peer connections over a local area network 508 can include WiFi® connections, Ethernet connections, Bluetooth® connections, broadband Internet connections, etc. A peer-to-peer connection between a group of computing devices may utilize one or more peer-to-peer connection protocols, such as a multicast Doman Name Service (mDNS) protocol (e.g., to transmit peer-to-peer authentication tokens), a zero-configuration-networking protocol (e.g., the Bonjour protocol), etc.

In some examples, based at least in part on the first client device 504 and the second client device 506 having a common association with the same group identifier, the first client device 504 and the second client device 506 can both have access to (e.g., store within their local storage media) a group-wide encryption protocol defining at least one of a group-wide encryption key, a group-wide decryption key, and a group-wide common encryption/decryption key. Moreover, based at least in part on the first client device 504 and the second client device 506 having common access to the local area network 508, the first client device 504 and the second client device 506 can be able to transmit communication packets to each other via the local area network 508. For example, the first client device 504 and the second client device 506 may be able to transmit communication packets to each other via the local area network 508 and using a multicast Domain Name System (mDNS) protocol.

In at least one example, the first client device 504 can transmit a peer-to-peer (P2P) connection request 510 to a group-based communication system 502 via one or more networks. In at least one example, the peer-to-peer connection request 510 can be transmitted via a wide area connection. In at least one example, a wide area connection can refer to a connection using a wide area network between two or more computing devices that are each connected to the wide area network. A wide area network is a communications network that can span a large geographic area such as across cities, states, or countries. An example of a wide area network is a network that connects many local area networks, such as the Internet. Examples of wide area connections include a connection between a client device and a server device using a Transport Control Protocol (TCP) connection, such as a connection that utilizes a TCP-based application-level protocol, such as the WebSocket protocol. In some embodiments, a wide area connection is connection established using a Web Real Time Connection (WebRTC) technology.

In some examples, the peer-to-peer connection request 510 can comprise a data object transmitted by the first client device 504 to the group-based communication system 502 that requests initiation of a peer-to-peer connection between the first client device 504 and at least the second client device 506. That is, in at least one example, the peer-to-peer connection request 510 can comprise one or more items of data transmitted from the first client device 504 to the group-based communication system 502. In some examples, the peer-to-peer connection request 510 may be a communication packet with a header and a payload, where the first client device 504 and at least the second client device 506 are identified (e.g., via respective identifiers) in at least one of the header and the payload of the communication packet. In some examples, at least a portion of the payload of the peer-to-peer connection request 510 (e.g., at least a portion of the payload that identifies the first client device 504 associated with the peer-to-peer connection request 510 and at least the second client device 506 associated with the peer-to-peer connection request 510) may be encrypted.

In at least one example, the peer-to-peer connection request 510 can request to provide peer-to-peer initiation instructions configured to cause the establishment of a peer-to-peer connection between two or more client devices identified by the peer-to-peer connection request 510 (e.g., at least the first client device 504 and the second client device 506). In some examples, the first client device 504 can generate the peer-to-peer connection request 510 based at least in part on identifying that it has a peer-to-peer connection with at least the second client device 506. In some examples, the first client device 504 can transmit the peer-to-peer connection request 510 to the group-based communication system 502 via a WebSocket connection to the group-based communication system 502. In some examples, the peer-to-peer connection request 510 can be transmitted as an application programming interface (API) call to an API associated with the group-based communication system 502.

In at least one example, the group-based communication system 502 can determine whether the peer-to-peer connection request 510 is authorized. In at least one example, the group-based communication system 502 can compare the first client identifier and the second client identifier with a group-based communication system validation registry to determine whether the peer-to-peer connection request 510 is authorized.

In at least one example, the group-based communication validation registry can comprise a table, array, or data structure that is configured to identify when a peer-to-peer connection between two or more client devices that are validly connected to a group-based communication system 502 can be established. In some examples, the group-based communication system validation registry can identify one or more peer-to-peer groups of group-based user profiles associated with the group-based communication system 105, where each peer-to-peer group includes two or more group-based user profiles of the group-based communication system 502 that are deemed authorized to communicate with each other using secure peer-to-peer data connections. In some examples, two or more user profiles can be in a peer-to-peer group if they are associated with a common group (e.g., associated with a same group identifier) and/or are associated with a common group-based communication interface.

As used herein, the term "group-based communication interface" can refer to a virtual communications environment configured to facilitate user interaction with a group-based communications system. Each group-based communication interface is accessible and viewable to a select group of users (i.e., users that are associated with a selected group identifier), such as a group of employees of a business or organization (e.g., the ACME Corp. interface would be accessible and viewable to the ACME employees however the BETA Corporation group-based communication interface would not be accessible and viewable to ACME employees). The group-based communication interface can include a plurality of group-based communication channels (e.g., a marketing channel, sales channel, accounting channel, etc.).

In at least one example, based at least in part on a determination that the peer-to-peer connection request 510 is authorized (e.g., the first client identifier and the second client identifier are associated with a same peer-to-peer group, the first client identifier is associated with a token, etc.) the group-based communication system 502 can transmit a peer-to-peer (P2P) initiation instruction 512 to the second client device 506, where the peer-to-peer initiation instruction 512 is configured to trigger establishment of a peer-to-peer connection between the second client device 506 and the first client device 504 for sharing group-based communication system data 514. In at least one example, the peer-to-peer initiation instruction 512 can comprise a data object that indicates at least one of (i) a characteristic or (ii) condition associated with data to be shared via the peer-to-peer connection. For instance, in at least one example, a peer-to-peer initiation instruction 512 can refer to one or more items of data transmitted by the group-based communication system 502 that describe instructions to a client device (e.g., the second client device 506) to establish a peer-to-peer connection with at least one other client device (e.g., the first client device 504). In some examples, the peer-to-peer initiation instruction 512 can comprise a data object configured to cause the second client device 506 to transmit particular data (e.g., particular data associated with the group-based communication system 502) to the first client device 504. In some examples, the peer-to-peer initiation instruction 512 can include the first client identifier so that the second client device 506 can identify the first client device 504. In some examples, the peer-to-peer initiation instruction 512 can designate which group-based communication system data 514 the second client device 506 is to transmit to the first client device 504, a timing associated with when the group-based communication system data 514 is to be transmitted, a condition associated with when the group-based communication system data 514 is to be transmitted, and/or the like. Additional details are described below with reference to FIG. 4.

In at least one example, based at least in part on receiving the peer-to-peer initiation instruction 512, the second client device 506 can transmit the group-based communication system data 514 to the first client device 504. In at least one example, such data can be transmitted via the local area network 508.

While various examples of the present disclosure are described with reference to peer-to-peer communications between two client devices, a person of ordinary skill in the relevant technology will recognize that the disclosed techniques can be utilized to facilitate peer-to-peer communications between any number of client devices. In some examples, the peer-to-peer initiation instructions transmitted by the group-based communication system 502 to a group of n client devices are configured to cause at least one pair of the n client devices to have a peer-to-peer connection.

In some examples, the peer-to-peer initiation instructions can be transmitted by the group-based communication system 502 to the n client devices. Such a peer-to-peer communication configuration can cause the creation of a mesh network having a particular mesh architecture between the n client devices, where the mesh network enables each pair of client devices of the n client devices to have a direct or indirect peer-to-peer communication link between them. For example, given three client devices C1, C2, and C3, one example mesh network may provide a peer-to-peer connection between C1 and C2 and a peer-to-peer connection between C1 and C3, while another example mesh network may provide a peer-to-peer connection between C1, C2, and C3.

The particular architecture mesh of a mesh network associated with n client devices architecture may be designed in accordance with a mesh architecture design routine configured to optimize one or more features. Such features can include minimizing the maximum number of peer-to-peer connections that any one of then client devices is associated with while ensuring full peer-to-peer linkage of the n client devices, minimizing the longest minimum number of peer-to-peer connections that connect any pair of client devices from then client devices (e.g., minimizing the maximum number of hops between two client devices within the mesh network), and/or the like. In some examples, a model can be used to moderate (e.g., enforce a tradeoff between) individual of the features described above. In some examples, where the model can assign statically-defined and/or run-time-determinable weights to individual features for optimization as described above.

Example System Architecture

Methods, apparatuses, and computer program products of the present disclosure may be embodied by any of a variety of devices. For example, techniques described herein can be performed by a networked device (e.g., an enterprise platform), such as a server or other network entity, configured to communicate with one or more devices, such as one or more client devices. Additionally or alternatively, techniques described herein can be performed by a computing device that may include a fixed computing device, such as a personal computer or a computer workstation. In some examples, techniques described herein can be performed by a mobile device, such as a portable digital assistant (PDA), mobile telephone, smartphone, laptop computer, tablet computer, wearable, or any combination of the aforementioned devices.

FIG. 1 illustrates an example architecture 100 for performing various examples of the present disclosure. Users may access a group-based communication system 105, which can correspond to the group-based communication system 502 described above, using a client system 104, which can be associated with one or more client devices, such as client devices 102A-N. The client devices 504 and 506 described above can correspond to individual of the client devices 102A-N. In at least one example, the client system 104 may be a local network of an institution such as a workplace that can utilize the group-based communication system 105. A client device can comprise computer hardware and/or software that is configured to access a service (e.g., group-based communication service) made available via a server or other system (e.g., the group-based communication system 105).

In at least one example, a "user" can refer to an individual, group of individuals, business, organization, and/or the like. A user can access a group-based communication or messaging system using a client device, such as any of the client devices 102A-N. In at least one example, each user of the group-based communication system 105 can be associated with at least one group identifier indicating that the corresponding user is associated with the at least one group with which the at least one group identifier is associated.

In at least one example, the communication system described herein can be "group-based" such that a system, channel, message, or virtual environment associated therewith has security sufficient to restrict access to a defined group of users. The group (of users) may be defined by common access credentials such as those of an organization or commercial enterprise. Access may further be facilitated by a validated request to join a group or an invitation to join a group transmitted by one group member user to another non-member user. As described above, a group can be associated with a "workspace" (e.g., a "group-based communication workspace"). As used herein, a group can refer to a group of users and a set of group-based communication objects all of which can be associated with a common group identifier.

In some examples, users of the group-based communication system 105 can be organized into groups. In some examples, each group can be associated with a single organization. In some examples, a group can be associated with two or more different organizations. In some examples, an organization can be associated with two or more groups. In some examples, users of the group-based communication system 105 can be organized into organization groups (e.g., employees of each company may be a separate organization group) and each organization group may have one or more group-based communication channels (or other virtual spaces including but not limited to direct messages, boards, etc.) to which users may be assigned and/or which the users may join (e.g., group-based communication channels may represent departments, geographic locations such as offices, product lines, user interests, topics, issues, and/or the like). A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

In some examples, users of the group-based communication system 105 may join group-based communication channels and/or other virtual spaces. Some group-based communication channels and/or other virtual spaces may be globally accessible to those users having a particular organizational group identifier associated with their user profile (i.e., users who are members of the organization). Access to some group-based communication channels and/or other virtual spaces may be restricted to members of specified groups, whereby the group-based communication channels and/or other virtual spaces are accessible to those users having a particular group identifier associated with their user profile. An example of such other virtual spaces can include direct messages (e.g., a virtual space for private communication between two or more users), a board (e.g., a virtual space with which one or more objects (e.g., messages, files, action items, etc.) can be associated and accessed), etc.

In at least one example, a group-based communication channel identifier, which can be referred to as a "channel identifier," can refer to one or more items of data by which a group-based communication channel may be identified. For example, a group-based communication channel identifier may comprise ASCII ("American Standard Code for Information Interchange") text, a pointer, a memory address, and the like. A group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier). Other virtual spaces can be associated with respective identifiers for controlling access thereto, as described above with respect to channel identifiers.

As used herein, the terms "profile," "user profile," "user account," and "user account details" can refer to information associated with a user, including, for example, a user identifier, one or more group-based communication channel identifiers associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., jdoe), a password, a real name, a time zone, a status, and the like. The user account details can include a subset designation of user credentials, such as, for example, login information for the user including the user's username and password.

In at least one example, the group-based communication system 105 may comprise a group-based communication server 106 in communication with at least one group-based communication repository 108. The group-based communication system 105 may be configured to communicate with the client system 104 using a wide area network 112. The client devices 102A-N in the client system 104 may in turn be configured to communicate with each other using a local area network 111, such as a local area network using at least one of a Wi-Fi® connection, an Ethernet connection, a Bluetooth® connection, etc. Communications between the group-based communication system 105 and the client devices 102A-N may be performed using a protocol that is, at least in part, customized to suit the needs of the group-based communication system. In some examples, the protocol can comprise a custom protocol of JavaScript Object Notation (JSON) objects sent via a WebSocket channel. In some examples, the protocol can comprise JSON over Remote Procedural Call (RPC), JSON over Representational State Transfer (REST)/HyperText Transfer Protocol (HTTP), and/or the like. In some examples, operation of the client devices 102A-N in local area networks can offer low latency, high bandwidth data communication connections relative to data communications occurring, for example, over a wide area network.

The group-based communication server 106 may be embodied as a computer or computers as known in the art. The group-based communication server 106 may provide for receiving of electronic data from various sources, including but not limited to the client devices 102A-N. For example, the group-based communication server 106 may be operable to receive and post or transmit group-based messaging communications provided by the client devices 102A-N.

The group-based communication repository 108 may be embodied as a data storage device such as a Network Attached Storage (NAS) device or devices, or as a separate database server or servers. In at least one example, the group-based communication repository 108 can store data that can be accessed, modified, and/or otherwise maintained by the group-based communication system 105. The stored data can include information that facilitates the operation of the group-based communication system 105. For example, the group-based communication repository 108 may include, without limitation, a plurality of messaging communications organized among a plurality of group-based communication channels, and/or the like. The group-based communication repository 108 may be embodied as a data storage device or devices, as a separate database server or servers, or as a combination of data storage devices and separate database servers. Further, in some embodiments, the group-based communication repository 108 may be embodied as a distributed repository such that some of the stored data can be stored centrally in a location within the group-based communication system 105 and other data can be stored in a single remote location or a plurality of remote locations. Alternatively, in some embodiments, the group-based communication repository 108 may be distributed over a plurality of remote storage locations only.

The client devices 102A-N may comprise computer hardware and/or software that is configured to access a service (e.g., group-based communication service) made available via a server or other system (e.g., the group-based communication system 105 and/or the group-based communication server 106). For example, the client devices 102A-N may include desktop computers, laptop computers, smartphones, netbooks, tablet computers, wearables, and the like. In some examples, the client devices 102A-N can be personal computers, enterprise computers, and/or the like. In examples where a client device 102A-N is a mobile device, such as a smartphone or tablet, the client device 102A-N may execute an application (e.g., an "app") to interact with the group-based communication system 105. Such apps can be designed to execute on mobile devices, such as tablets or smartphones. For example, an app may be provided that executes on mobile device operating systems such as iOS®, Android®, or Windows®. These platforms can provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system. Additionally or alternatively, the client device 102A-N may interact with the group-based communication system 105 via a web browser. As yet another example, the client device 102A-N may include various hardware or firmware designed to interface with the group-based communication system 105. Electronic data received by the group-based communication server 106 from the client devices 102A-N may be provided in various forms and via various methods.

In some examples, a message or messaging communication may be sent from a client device 102A-N to a group-based communication system 105. For the purpose of this discussion, a "messaging communication" or "message" can refer to any electronically generated digital content object provided by a user using a client device 102A-N and that is configured for display within a group-based communication channel. Message communications may include any text, image, video, audio or combination thereof provided by a user (using a client device 102A-N). For example, the user may provide a messaging communication that includes text as well as an image and a video within the messaging communication as message contents. In such an example, the text, image, and video would comprise the messaging communication or digital content object. Each message sent or posted to a group-based communication channel of the group-based communication system 105 can include metadata comprising one or more of a sending user identifier, a message identifier, message contents (e.g., text, emojis, images, links), a group identifier, a group-based communication channel identifier attachments (e.g., files), message hierarchy data (e.g., the message may be a reply to another message), third party metadata, and/or the like. Individual of the foregoing identifiers may comprise ASCII text, a pointer, a memory address, and the like.

In at least one example, a message may be sent to the group-based communication system 105 directly by a client device 102A-N, the message may be sent to the group-based communication system 105 via an intermediary such as a message server, and/or the like. In one example, the message may include data such as, attachments (e.g., files), message hierarchy data (e.g., the message may be a reply to another message), third party metadata, and/or the like.

The group-based communication system 105 comprises at least one group-based communication server 106 that may create a storage message based upon the received message to facilitate message indexing and storage in a group-based communication repository 108. In one implementation, the storage message may include data such as a message identifier, a group identifier, a group-based communication channel identifier, a sending user identifier, topics, responses, message contents, attachments, message hierarchy data, third party metadata, conversation primitive data, and/or the like.

In examples, a group identifier as defined above may be associated with the message. In examples, a group-based communication channel identifier as defined above may be associated with the message. In examples, a sending user identifier as defined above may be associated with the message. In one implementation, the message may be parsed (e.g., using PHP commands, commands associated with a script language derived from Personal Home Page Tools) to determine a sending user identifier of the user who sent the message. In examples, topics may be associated with the message. In one implementation, the message contents may be parsed (e.g., using PHP commands) to determine topics discussed in the message. For example, hashtags in the message may indicate topics associated with the message. In another example, the message may be analyzed (e.g., by itself, with other messages in a conversation primitive) or parsed using a machine learning technique, such as topic modeling, to determine topics associated with the message.

In examples, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database.

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In examples, attachments may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In examples, third party metadata may be associated with the message. For example, third party metadata may provide additional context regarding the message or the user that is specific to a company, group, group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the group-based communication channel).

In examples, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In examples, various metadata, determined as described above, and/or the contents of the message may be used to index the message (e.g., using the conversation primitive) to facilitate various facets of searching (i.e., search queries that return results from group-based communication repository 108). In one implementation, a storage message may be sent from group-based communication server 106 to facilitate indexing in group-based communication repository 108. In another implementation, metadata associated with the message may be determined and the message may be indexed in group-based communication repository 108. In one example, the message may be indexed such that messages of a company or a group are indexed separately (e.g., in a separate index associated with the group and/or company that is not shared with other groups and/or companies). In one implementation, messages may be indexed at a separate distributed repository (e.g., to facilitate data isolation for security purposes).

If there are attachments associated with the message, file contents of the associated files may be used to index such files in group-based communication repository 108 to facilitate searching. In one example, the files may be indexed such that a company's or a group's files are indexed at a separate distributed repository.

Messages and/or other data (e.g., which can additionally or alternatively be referred to as "content," "digital content," "digital content object," "information," "payload object," and/or the like) can be transmitted, received, and/or stored as described herein. In examples where a computing device is described herein to receive a message and/or other data from another computing device, it will be appreciated that the message and/or other data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send a message and/or data to another computing device, it will be appreciated that the message and/or data may be sent directly to another computing device or may be sent indirectly via one or more intermediary computing devices, such as, for example, one or more servers, relays, routers, network access points, base stations, hosts, and/or the like.

In at least one example, messages and/or other data can be sent and/or received via a group-based communication channel. In at least one example, the term "group-based communication channel" can refer to a virtual communications environment or feed that can be configured to display messaging communications posted by channel members (e.g., validated users accessing the group-based communication system 105 using client devices 102A-N) that are viewable only to the members of the group. A format of the group-based communication channel may appear differently to different members of the group-based communication channel; however, messages and/or other data associated with the group-based communication channel can be displayed to each member of the group-based communication channel. For instance, a common set of group-based messaging communications can be displayed to each member of the respective group-based communication channel such that the content of the group-based communication channel (i.e., messaging communications) may not vary per member of the group-based communication channel.

Example Apparatus for Implementing Embodiments of the Present Disclosure

Figure 2:
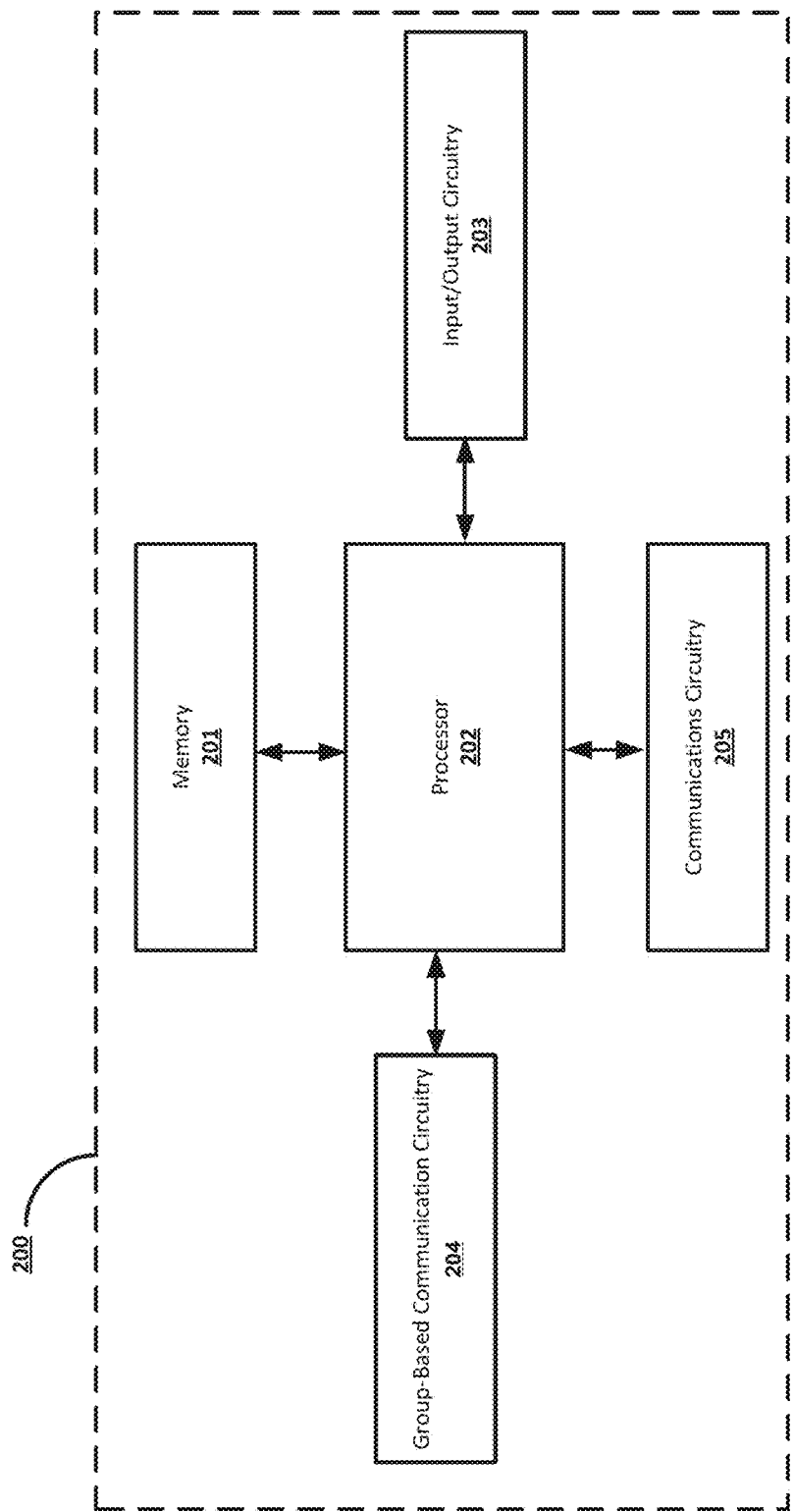
FIG. 2 depicts an example apparatus for a group-based communication server according to some examples of the present disclosure.

The group-based communication server 106 may be embodied by one or more computing systems, such as apparatus 200 shown in FIG. 2. The apparatus 200 may include a processor 202, a memory 201, input/output circuitry 203, communications circuitry 205, and group-based communication circuitry 204. The apparatus 200 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some examples, software for configuring the hardware. For example, in some examples, "circuitry" may include processing circuitry, storage media, network interfaces, input/output devices, and the like. In some examples, other elements of the apparatus 200 may provide or supplement the functionality of particular circuitry. For example, the processor 202 may provide processing functionality, the memory 201 may provide storage functionality, the communications circuitry 205 may provide network interface functionality, and the like.

In some examples, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the apparatus 200 to carry out various functions in accordance with examples of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an example of the present disclosure while configured accordingly. Alternatively, as another example, when the processor is embodied as an executor of software instructions, the instructions may specifically configure the processor to perform the algorithms and/or operations described herein when the instructions are executed.

As an example, the processor 202 may be configured to maintain one or more communication channels connecting a plurality of client devices 102A-N to enable message sharing therebetween. The processor 202 ensures that messages intended for exchange between the client devices 102A-N within the particular communication channel are properly disseminated to those client devices 102A-N for display within respective display windows provided via the client devices 102A-N.

Moreover, the processor 202 may be configured to synchronize messages exchanged on a particular communication channel with a database for storage and/or indexing of messages therein. In certain examples, the processor 202 may provide stored and/or indexed messages for dissemination to client devices 102A-N.

In some examples, the apparatus 200 may include input/output circuitry 203 that may, in turn, be in communication with processor 202 to provide output to the user and, in some examples, to receive an indication of a user input. The input/output circuitry 203 may comprise a user interface and may include a display. In at least one example, the user interface can be presented via a web user interface, a mobile application, or the like. In some examples, the input/output circuitry 203 may also include a keyboard, a mouse, a joystick, a touch screen, touch areas, soft keys, a microphone, a speaker, or other input/output mechanisms. The processor 202 and/or user interface circuitry comprising the processor 202 may be configured to control one or more functions of one or more user interface elements through computer program instructions (e.g., software and/or firmware) stored on a memory accessible to the processor 202 (e.g., memory 201, and/or the like).

The communications circuitry 205 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The group-based communication circuitry 204 can include hardware configured to support a group-based communication system, such as the group-based communication system 105. The group-based communication circuitry 204 may utilize processing circuitry, such as the processor 202, to perform these actions. The group-based communication circuitry 204 may send and/or receive data from a group-based communication repository, such as the group-based communication repository 108. In some examples, sent and/or received data may be of messages and/or other data that can be organized among a plurality of group-based communication channels, as described above. It should also be appreciated that, in some examples, the group-based communication circuitry 204 may include a separate processor, specially configured field programmable gate array (FPGA), or application specific interface circuit (ASIC).

It is also noted that all or some of the information discussed herein can be based on data that is received, generated and/or maintained by one or more components of apparatus 200. In some examples, one or more external systems (such as a remote cloud computing and/or data storage system) may also be leveraged to provide at least some of the functionality discussed herein.

As described above and as will be appreciated based on this disclosure, examples of the present disclosure may be configured as methods, mobile devices, backend network devices, and the like. Accordingly, examples may comprise various means including entirely of hardware or any combination of software and hardware. Furthermore, examples may take the form of a computer program product on at least one non-transitory computer-readable storage medium having computer-readable program instructions (e.g., computer software) embodied in the storage medium. Similarly, examples may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

As will be appreciated, any such computer program instructions and/or other type of code may be loaded onto a computer, processor or other programmable apparatus's circuitry to produce a machine, such that the computer, processor, or other programmable circuitry that execute the code on the machine creates the means for implementing various functions, including those described herein.

Client Device Overview

Figure 3:
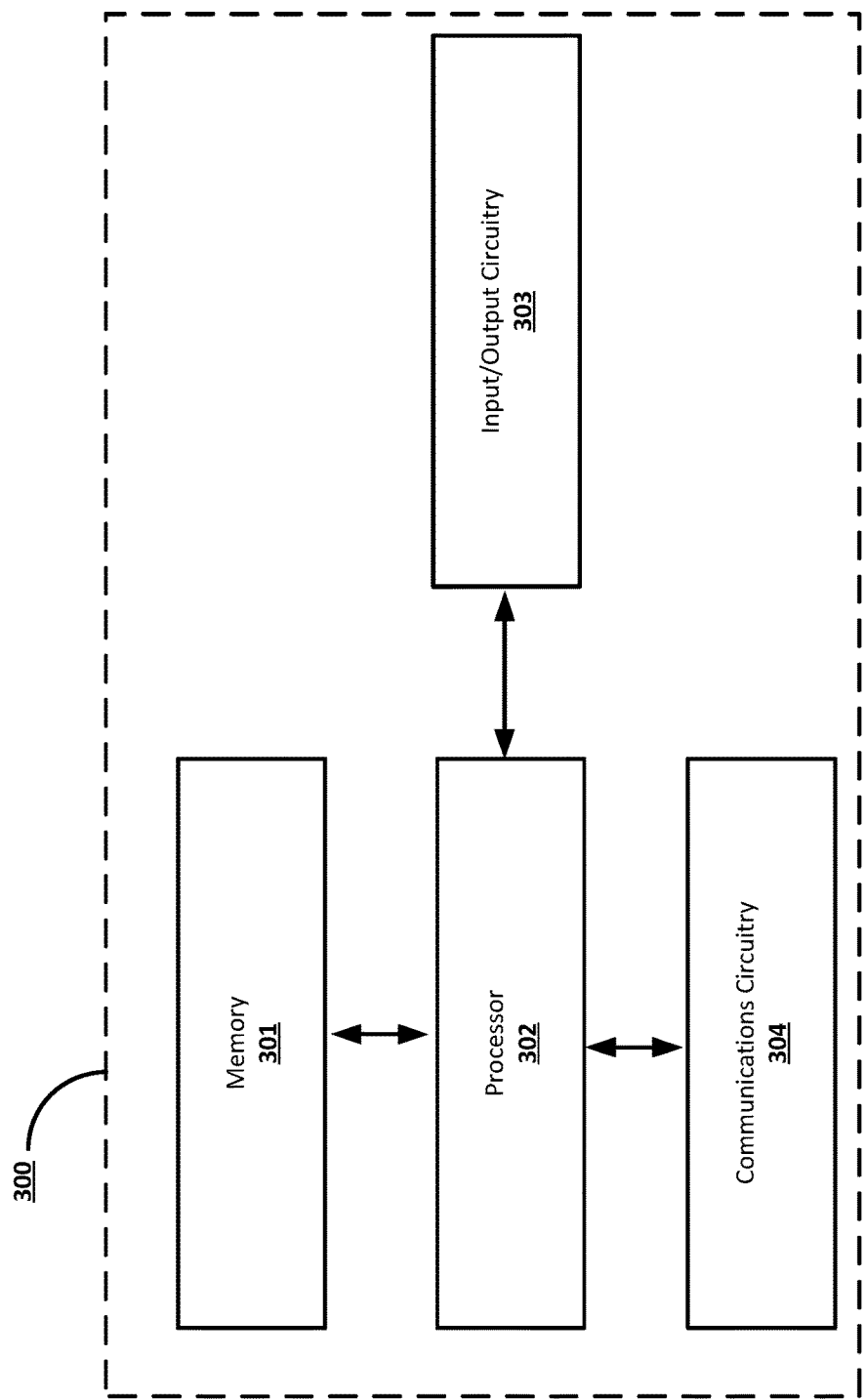
FIG. 3 depicts an example apparatus for a client device according to some examples of the present disclosure.

A client device 102A-N may include one or more computing systems, such as the apparatus 300 shown in FIG. 3. The apparatus 300 may include a processor 302, a memory 301, input/output circuitry 303, and communications circuitry 304. The apparatus 300 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some examples, software for configuring the hardware. In some examples, "circuitry" may include processing circuitry, storage media, network interfaces, input/output devices, and the like. In some examples, other elements of the apparatus 300 may provide or supplement the functionality of particular circuitry. For example, the processor 302 may provide processing functionality, the memory 301 may provide storage functionality, the communications circuitry 304 may provide network interface functionality, and the like.

In some examples, the processor 302 (and/or co-processor or any other processing circuitry assisting or otherwise associated with the processor) may be in communication with the memory 301 via a bus for passing information among components of the apparatus. The memory 301 may be non-transitory and may include, for example, one or more volatile and/or non-volatile memories. In other words, for example, the memory may be an electronic storage device (e.g., a computer readable storage medium). The memory 301 may be configured to store information, data, content, applications, instructions, or the like, for enabling the apparatus 300 to carry out various functions in accordance with examples of the present disclosure.

The processor 302 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example, the processor 302 may be configured to execute instructions stored in the memory 301 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an example of the present disclosure while configured accordingly. Alternatively, as another example, when the processor is embodied as an executor of software instructions, the instructions may specifically configure the processor 302 to perform the algorithms and/or operations described herein when the instructions are executed.

In some examples, the apparatus 300 may include input/output circuitry 303 that may, in turn, be in communication with processor 302 to provide output to the user and, in some examples, to receive an indication of a user input. The input/output circuitry 303 may comprise a user interface and may include a display. In some examples, the user interface may be presented via a web user interface, a mobile application, or the like. In some examples, the input/output circuitry 303 may also include a keyboard, a mouse, a joystick, a touch screen, touch areas, soft keys, a microphone, a speaker, or other input/output mechanisms. The processor 302 and/or user interface circuitry comprising the processor 302 may be configured to control one or more functions of one or more user interface elements through computer program instructions (e.g., software and/or firmware) stored on a memory accessible to the processor 302 (e.g., memory 301, and/or the like).

The communications circuitry 304 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 304 may include, for example, a network interface for enabling communications with a wired or wireless communication network. For example, the communications circuitry 304 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

It is also noted that all or some of the information discussed herein can be based on data that is received, generated and/or maintained by one or more components of apparatus 300. In some examples, one or more external systems (such as a remote cloud computing and/or data storage system) may also be leveraged to provide at least some of the functionality discussed herein.

As described above and as will be appreciated based on this disclosure, examples of the present disclosure may be configured as methods, mobile devices, backend network devices, and/or the like. Accordingly, examples may comprise various means including entirely of hardware or any combination of software and hardware. Furthermore, examples may take the form of a computer program product on at least one non-transitory computer-readable storage medium having computer-readable program instructions (e.g., computer software) embodied in the storage medium. Similarly, examples may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

As will be appreciated, any such computer program instructions and/or other type of code may be loaded onto a computer, processor or other programmable apparatus's circuitry to produce a machine, such that the computer, processor, or other programmable circuitry that execute the code on the machine creates the means for implementing various functions, including those described herein.

Example System Operations

Figure 4:
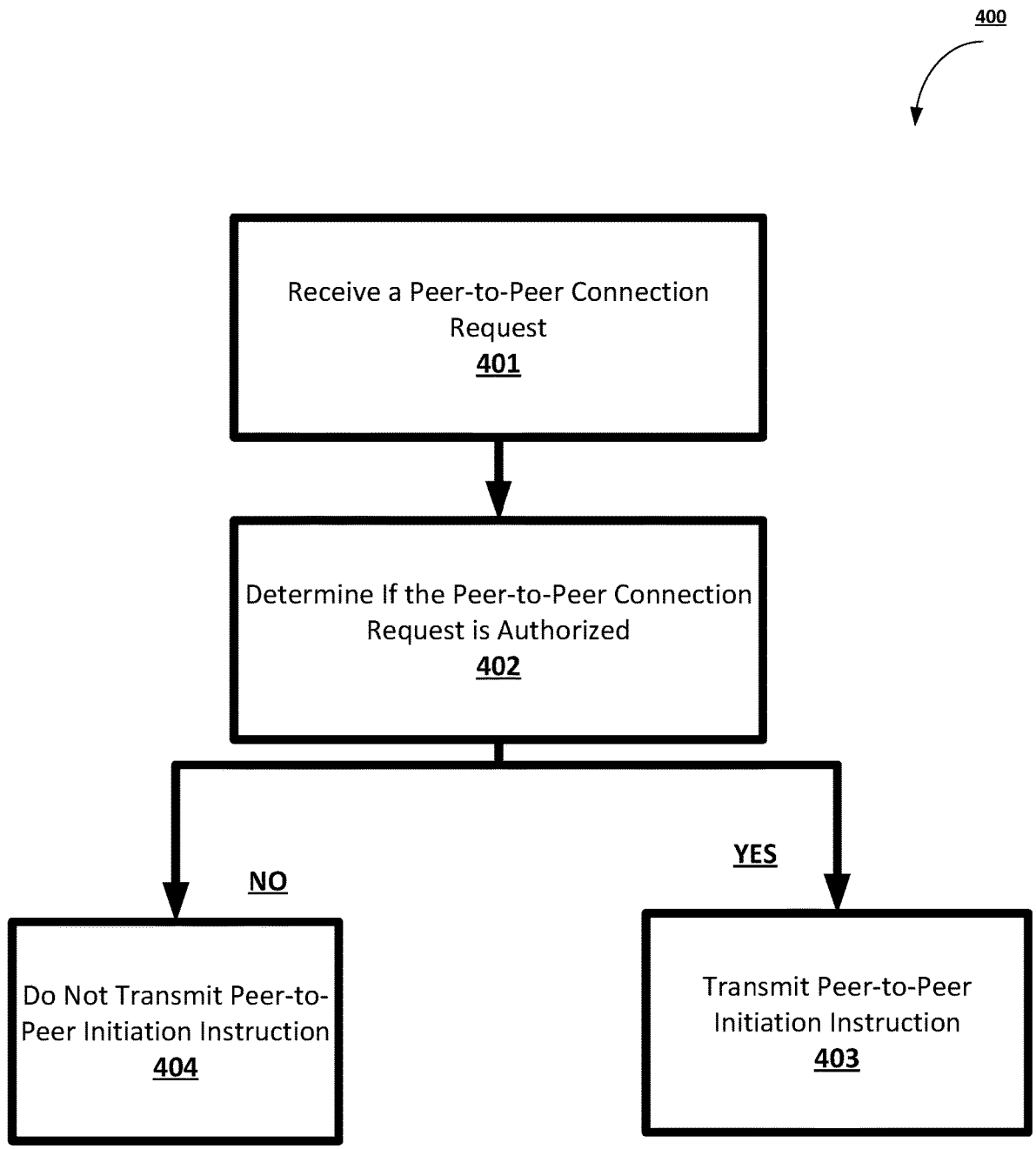
FIG. 4 is a flowchart diagram of an example process for facilitating secure peer-to-peer connections according to some examples of the present disclosure.

FIG. 4 is a flowchart diagram of an example process 400 for facilitating secure peer-to-peer data connections between the client devices 102A-N. Via the operations of process 400, the group-based communication server 106 can enable client devices 102A-N that maintain a WebSocket connection with the group-based communication system 105 to transmit data associated with the group-based communication system 105 to each other using the local area network 111 of the client system 104. In doing so, the group-based communication server 106 can grant peer-to-peer connection capabilities to client devices 102A-N that are being used by legitimate end-users of the group-based communication system 105 and thus maintain a WebSocket connection with the group-based communication system 105, while denying the noted capabilities to other computing devices that do not maintain a WebSocket connection with the group-based communication system 105.

While various examples of the present disclosure are described with reference to a group-based communication server 106 of a group-based communication system 105, a person of ordinary skill in the relevant technology will recognize that the disclosed techniques can be utilized to enable secure peer-to-peer data transmission between client devices in any server system, such as any server system that enables end-users to interact with the server system using user profiles associated with the noted end-users. Moreover, while various examples of the present disclosure describe establishment of peer-to-peer connections and non-peer-to-peer connections (e.g., client-server connections) using local area networks and wide area networks respectively, a person of ordinary skill in the relevant technology will recognize that peer-to-peer connections may be established through wide area networks and non-peer-to-peer connections may be established through local area networks.

The process 400 begins at operation 401 when the group-based communication server 106 receives a peer-to-peer connection request comprising a first client identifier associated with a first client device (e.g., a requesting client device and requesting client identifier) and a second client identifier associated with a second client device (e.g., a target client device and target client identifier). As described above, in some examples, the peer-to-peer connection request can comprise a data object transmitted by the first client device to the group-based communication server 106 (e.g., via a wide area network such as the wide area network 112) that requests initiation of a peer-to-peer connection between the first client device and the second client device. That is, in at least one example, the peer-to-peer connection request can comprise one or more items of data transmitted from the first client device to the group-based communication server 106. In some examples, the peer-to-peer connection request may be a communication packet with a header and a payload, where the first client device associated with the peer-to-peer connection request and at least the second client device associated with the peer-to-peer connection request may be identified (e.g., via a respective identifier) in at least one of the header and the payload of the communication packet. In some examples, at least a portion of the payload of the peer-to-peer connection request (e.g., at least a portion of the payload that identifies the first client device associated with the peer-to-peer connection request and at least the second client device associated with the peer-to-peer connection request) may be encrypted.

In at least one example, the peer-to-peer connection request can request to provide peer-to-peer initiation instructions configured to cause the establishment of a peer-to-peer connection between two or more client devices identified by the peer-to-peer connection request. In some examples, the first client device may generate a peer-to-peer connection request and transmit the generated peer-to-peer connection request to the group-based communication server 106 to cause the establishment of a peer-to-peer connection between the first client device and at least the second client device.

In at least one example, the peer-to-peer connection request can be associated with a first client identifier, which can refer to one or more items of data by which a client device connected to a group-based communication system 105 may be identified by the group-based communication system 105 when transmitting a peer-to-peer connection request (e.g., when requesting establishment of a peer-to-peer connection). In at least one example, all peer-to-peer connection request queries can be resolved based, in part, on whether the first client identifier can be authenticated as associated with a validated user of the group-based communication system 105. A first client identifier may be embodied by American Standard Code for Information Interchange (ASCII) text, a pointer, a memory address, or other unique identifier. In at least one example, the first client identifier may comprise a user identifier of a corresponding group-based user profile of the group-based communication system 105 that is associated with the first user device (e.g., with an end-user that uses the first client device to connect to the group-based communication system 105), a group identifier of a group associated with the corresponding group-based user profile, and an instance identifier that identifies the first client device (e.g., a randomly-generated instance identifier for the first client device and/or a run-time-generated instance identifier for the first client device).

For the purpose of this discussion, the term "group-based user profile" can refer to a data object that uniquely identifies a corresponding user of a group-based communication system 105 and enables the corresponding user to access designated contents and/or functionalities of the group-based communication system 105. A group-based user profile may enable a corresponding user to login to the group-based communication system 105 and interact with various software and hardware functionalities provided by the group-based communication system 105. The group-based communication system 105 may enable a user to have access to particular digital information in accordance with user authorization information defined in part based on the group-based user profile of the user. For example, the group-based communication system may associate the group-based user profile with one or more group-based communication interfaces and accordingly grant the group-based system user-profile access to contents of the one or more group-based communication interfaces.

In at least one example, the peer-to-peer connection request can be associated with at least one second client identifier, which can refer to one or more items of data by which at least the second client device other than the first client device associated with the first client identifier (referred to herein as a target client device) can be identified. A target user identifier may be embodied as American Standard Code for Information Interchange (ASCII) text, a pointer, a memory address, or other unique identifier. In some examples, the second client identifier comprises a user identifier of a corresponding group-based user profile of the group-based communication system 105 that is associated with the second user device (e.g., an end-user that uses the second client device to connect to the group-based communication system), a group identifier of a group associated with the corresponding group-based user profile, and an instance identifier that identifies the second client device (e.g., a randomly-generated instance identifier for the second client device and/or a run-time-generated instance identifier for the second client device).

In some examples, the first client device can generate the peer-to-peer connection request based at least in part on identifying that it has a peer-to-peer connection with at least the second client device (e.g., via a local area network). In some examples, the first client device can transmit the peer-to-peer connection request to the group-based communication server 106 via a WebSocket connection to the group-based communication server 106, which, as described above can provide an added layer of security to at least some of the peer-to-peer communication functionalities discussed herein. In some examples, the first client device can transmit the peer-to-peer connection request to the group-based communication server 106 in response to (i) receiving a broadcast communication packet (e.g., an mDNS broadcast communication packet) from the second client device that identifies the second client identifier, where at least a portion of the broadcast communication packet has been encrypted using the group-wide encryption data and (ii) successfully decrypting the broadcast communication packet using the group-wide encryption data. In some examples, the second client device can be configured to generate the broadcast communication packet by encrypting at least a portion of the second client identifier (e.g., a portion of the second client identifier that includes the user identifier of the second client identifier and the group identifier of the second client identifier) using the group-wide encryption data. In some examples, the peer-to-peer connection request can be encrypted using an encryption key that is configured to be only accessible to the first client device, where the group-based communication server 106 is configured to maintain the decryption key that corresponds to the noted decryption key.

In some examples, the first client device can transmit the peer-to-peer connection request to the group-based communication server 106 in response to (i) receiving a peer-to-peer communication token from the second client device, (ii) providing the peer-to-peer communication token to the group-based communication server 106 to obtain, in response to the peer-to-peer communication token, a validation packet indicating that the peer-to-peer communication token has been validated, and (iii) obtaining the validation packet. In some examples, the peer-to-peer communication token can be generated by the group-based communication server 106 in response to a token generation request transmitted by the second client device to the group-based communication server 106 and based on encryption data maintained by the group-based communication server 106. In some examples, the encryption data can include an encryption routine configured to generate the peer-to-peer communication token based on the token generation request. In some examples, the validation packet can be generated by the group-based communication server 106 in response to determining that the peer-to-peer communication token is associated with a group comprising the first client device and the second client device. In some examples, determining that the peer-to-peer communication token is associated with a group comprising the first client device and the second client device comprises providing the peer-to-peer communication token to a decryption routine configured to generate, based on the peer-to-peer communication token, the token generation request used to generate the peer-to-peer communication token. In some examples, the validation packet can be generated by the group-based communication server 106 in response to determining that the output of the decryption routine is equivalent to and/or matches the token generation request used to generate the peer-to-peer communication token.

In some examples, after generating a peer-to-peer communication token in response to a token generation request by the first client device, the group-based communication server 106 can store the generated peer-to-peer communication token in a group-based communication validation registry, where the peer-to-peer group-based communication validation registry associates the peer-to-peer communication token with the first client device.

In some examples, the peer-to-peer connection request can be transmitted as an application programming interface (API) call to an API associated with the group-based communication system 105. In some examples, the peer-to-peer connection request can be transmitted via a gateway server connecting eligible client devices having WebSocket connections to the group-based communication system 105 with the group-based communication server 106 of the group-based communication system 105. In some examples, the first client device can identify the second client device as being on the same local area network as the first client device by using a zero-configuration-networking technique, such as by utilizing an app for discovering shared services on a local network (e.g., Bonjour, etc.) or by utilizing similar apps.

At operation 402, the group-based communication server 106 compares the first client identifier and the second client identifier to a group-based communication system validation registry (e.g., a group-based communication system validation registry stored on the group-based communication repository 108) to determine if the peer-to-peer connection request is authorized. In at least one example, the peer-to-peer connection request can be determined to be authorized based at least in part on a determination that the first client identifier and the second client identifier are associated with a same peer-to-peer group. In some examples, two or more user profiles can be in a peer-to-peer group if they are (i) associated with a common group (e.g., associated with a same group identifier) and (ii) have comparable privileges in relation to the common group. For example, in some embodiments, two or more user profiles associated with a common group may not be in a peer-to-peer group if one of the two user profiles has guest-level privileges and/or non-full-member-level privileges in relation to the common group.

In some examples, the peer-to-peer connection request can be determined to be authorized based at least in part on a determination that the first client device is associated with a token. In some examples, the group-based communication validation registry can comprise a list of peer-to-peer communication tokens generated by the group-based communication server 106. In such examples, the group-based communication validation registry may include an indication of an association between a peer-to-peer communication token and a client device, such as the first client device. In some examples, the group-based communication validation registry may include indications of circumstances in which the group-based communication server 106 can determine that a peer-to-peer connection can be established between a client device whose peer-to-peer connection request includes a particular peer-to-peer communication token and the first client device associated with the particular peer-to-peer communication token. That is, in some examples, subsequent to receiving a peer-to-peer communication request comprising the peer-to-peer communication token from another client device (e.g., the second client device), the group-based communication server 106 can determine that a peer-to-peer connection can be established between the second client device and the first client device associated with the peer-to-peer communication token according to the group-based communication validation registry.

At operation 403, in an example where the peer-to-peer connection request is authorized, the group-based communication server 106 can transmit a peer-to-peer initiation instruction to the second client device, where the peer-to-peer initiation instruction is configured to trigger establishment of a peer-to-peer connection between the second client device and the first client device for sharing group-based communication system data. At operation 404, in an example where the peer-to-peer connection request is not authorized, the group-based communication server 106 can refrain from transmitting a peer-to-peer initiation instruction to the second client device.

In at least one example, a peer-to-peer initiation instruction can refer to one or more items of data transmitted by the group-based communication server 106 that describe instructions to a second client device (e.g., the second client device) to establish a peer-to-peer connection with at least the first client device (e.g., the first client device). As described above, the peer-to-peer initiation instruction may be generated in response to receiving a peer-to-peer connection request from a first client device and determining, based on a group-based communication validation registry, that a peer-to-peer connection is authorized to be established between the first client device and the second client device identified by the peer-to-peer connection request.

In some examples, the peer-to-peer initiation instruction can comprise a data object configured to cause the second client device to transmit particular data (e.g., particular data associated with the group-based communication system 105) to the first client device. In some examples, the peer-to-peer initiation instruction comprises the first client identifier so that the second client device can identify the first client device. As described above, in some examples, the peer-to-peer initiation instruction can designate which data the second client device is to transmit to the first client device, a timing associated with when the data is to be transmitted, a condition associated with when the data is to be transmitted, and/or the like.

In some examples, the peer-to-peer initiation instruction can comprise a data object that instructs the second client device to transmit all data received from the group-based communication server 106 that is associated with a common group (e.g., a common group identifier) associated with the first client identifier and the second client identifier to the first client device. In some examples, the peer-to-peer initiation instruction can comprise a data object that instructs the second client device to transmit all data received from the group-based communication server 106 that is associated with a common group associated with the first client identifier and the second client identifier and that is requested by the first client device to the first client device.

In some examples, the peer-to-peer initiation instruction can comprise a data object that instructs the second client device to transmit all data received from the group-based communication server 106 that is associated with a common group associated with the first client identifier and the second client identifier to the first client device when the group-based communication server 106 communicates to the second client device that the first client device has no connection to the group-based communication server 106 and/or has a suboptimal (e.g., unsafe, slow, etc.) connection to the group-based communication server 106. In some examples, the peer-to-peer initiation instruction can comprise a data object that instructs the second client device to transmit all data received from the group-based communication server 106 that is associated with a common group (e.g., group identifier) associated with the first client identifier and the second client identifier and that is requested by the first client device to the first client device when the group-based communication server 106 communicates to the second client device that the first client device has no connection to the group-based communication server 106 and/or has a suboptimal (e.g., unsafe, slow, etc.) connection to the group-based communication server 106.

In some examples, the peer-to-peer initiation request is a data object that instructs the second client device to transmit a stored data identification communication packet to the first client device, wherein the stored data identification communication packet may identify a collection of data objects (e.g., content data objects, user profile data objects, and/or the like) associated with a common group (e.g., group identifier) associated with the first client identifier and the second client identifier that are stored on the second client device and/or that are accessible to the second client device. In some examples, the first client device may utilize the stored data identification communication packet to request particular data objects identified by the stored data identification communication packet from the second client device, which in turn, can cause establishment of a peer-to-peer connection for peer-to-peer transmission of particular data stored on the second client device between the first client device and the second client device without the need to retrieve the particular data from the group-based communication server 106. In this way, in some examples, utilizing secure peer-to-peer connections as discussed herein enables the connected client devices to perform functions of discrete application-level edge caches in a peer-to-peer manner.

In some examples, the peer-to-peer initiation instruction can be an instruction to the second client device to share its latest version of a shared digital asset (e.g., a shared document, such as a shared source code document) with the first client device. In some examples, the peer-to-peer initiation instruction can be an instruction to the second client device to receive update data associated with a shared digital asset from the first client device and integrate the noted update data in a version of the shared digital asset maintained by the first client device. In this way, in some examples, utilizing secure peer-to-peer connections discussed herein can reduce the need for expensive client-server transmissions in order to maintain version control across various personal copies of shared digital assets and/or in order to patch various updates to shared digital assets made by various user profiles.

In some examples, the first client device can refrain from accepting particular data from the second client device if the noted particular data is not cryptographically signed by group-wide encryption data associated with a common group of the first client device and the second client device. That is, in some examples, the first client device may accept data from the second client device so long as the data is cryptographically signed as described above. In some examples, the first client device can refrain from accepting particular data from the second client device if the noted particular data does not have a file contents signature that matches a file contents signature for the particular data provided by the group-based communication server 106 to the first client device. That is, in some examples, a valid file content signature (e.g., that matches, or otherwise corresponds, with another file contents signature) can be a condition for the first client device to accept data from the second client device.

As described above, while various examples of the present disclosure are described with reference to peer-to-peer communications between two client devices, a person of ordinary skill in the relevant technology will recognize that the disclosed techniques can be utilized to facilitate peer-to-peer communications between any number of client devices. In some examples, the peer-to-peer initiation instructions transmitted by the group-based communication system 105 to a group of n client devices are configured to cause at least one pair of the n client devices to have a peer-to-peer connection. In at least one example, such a peer-to-peer communication configuration can cause the creation of a mesh network having a particular mesh architecture between then client devices, where the mesh network enables each pair of client devices of the n client devices to have a direct or indirect peer-to-peer communication link between them.

CONCLUSION

Although example processing systems have been described in FIGS. 1-3, implementations of the subject matter and the functional operations described herein can be implemented in other types of digital electronic circuitry, or in computer software, firmware, or hardware, including the structures disclosed in this specification and their structural equivalents, or in combinations of one or more of them.

While this specification contains many specific implementation details, these should not be construed as limitations on the scope of any disclosures or of what may be claimed, but rather as description of features specific to particular examples of particular disclosures. Certain features that are described herein in the context of separate examples can also be implemented in combination in a single example. Conversely, various features that are described in the context of a single example can also be implemented in multiple examples separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

Thus, particular examples of the subject matter have been described. Other examples are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

Many modifications and other examples of the disclosures set forth herein will come to mind to one skilled in the art to which these disclosures pertain having the benefit of the teachings presented in the foregoing description and the associated drawings. Therefore, it is to be understood that the disclosures are not to be limited to the specific examples disclosed and that modifications and other examples are intended to be included within the scope of the appended claims. Although specific terms are employed herein, they are used in a generic and descriptive sense only and not for purposes of limitation, unless described otherwise.

That which is claimed is:

1. A group-based communication system comprising:
   one or more processors; and
   one or more computer-readable media storing instructions that, when executed by the one or more processors, cause the group-based communication system to perform operations comprising:
      receiving a peer-to-peer connection request associated with a first identifier for a first client device and a second identifier for a second client device;
      comparing the first identifier and the second identifier to a group-based communication system validation registry that is maintained by the group-based communication system and that stores data associated with groups of users of the group-based communication system;
      determining that the first identifier and the second identifier are both within a peer-to-peer group of the groups of users included within the data stored by the group-based communication system validation registry, wherein users included in the peer-to-peer group have been pre-authorized to establish peer-to-peer connections with one another; and
      based at least in part on a determination that the peer-to-peer connection request is authorized based at least in part on the first identifier and the second identifier both being within the peer-to-peer group, causing establishment of a peer-to-peer connection between the second client device and the first client device for sharing data associated with the group-based communication system.

2. The group-based communication system as claim 1 recites, wherein the peer-to-peer connection request is received, from the first client device, in response to the first client device (i) receiving a broadcast communication packet from the second client device, wherein at least a portion of the broadcast communication packet is encrypted using encryption data associated with a group with which the first identifier and the second identifier are associated, and (ii) decrypting the broadcast communication packet using the encryption data.

3. The group-based communication system as claim 1 recites, the operations further comprising:
   receiving, from the second client device, a token generation request;
   generating, based at least in part on the token generation request and encryption data, a token; and
   sending the token to the first client device, wherein the peer-to-peer connection request is received in response to sending the token to the first client device.

4. The group-based communication system as claim 3 recites, the operations further comprising:
   receiving the token from the first client device;
   generating, in response to receiving the token and based at least in part on a second determination that the first client device, the second client device, and the token are associated with a same group, a validation packet; and
   sending the validation packet to the first client device, wherein the peer-to-peer connection request is received in response to sending the validation packet to the first client device.

5. The group-based communication system as claim 4 recites, wherein determining that the first client device, the second client device, and the token are associated with the same group is based at least in part on a decryption routine, and wherein generating the validation packet is further based at least in part on a second determination that an output of the decryption routine corresponds to a token generation request used to generate the token.

6. The group-based communication system as claim 4 recites, the operations further comprising storing the token in the group-based communication system validation registry, wherein the token is associated with the first client device and is usable for determining whether the peer-to-peer connection request is authorized.

7. The group-based communication system as claim 1 recites, the operations further comprising:
   determining whether the first identifier and the second identifier are associated with at least one of a same group identifier or a same group-based communication interface; and
   based at least in part on a second determination that the first identifier and the second identifier are associated with at least one of the same group identifier or the same group-based communication interface, determining that the peer-to-peer connection request is authorized.

8. The group-based communication system as claim 7 recites, the operations further comprising:
   determining whether the first identifier and the second identifier are associated with a same privilege; and
   based at least in part on a second determination that the first identifier and the second identifier are associated with the same privilege, determining that the peer-to-peer connection request is authorized.

9. The group-based communication system as claim 1 recites, wherein the peer-to-peer connection request is associated with a token, the operations further comprising:
determining whether the first identifier is associated with the token in the group-based communication system validation registry; and
based at least in part on a second determination that the first identifier is associated with the token in the group-based communication system validation registry, determining that the peer-to-peer connection request is authorized.

10. The group-based communication system as claim 1 recites, the operations further comprising, based at least in part on the determination that the peer-to-peer connection request is authorized per the group-based communication system validation registry, transmitting, to the second client device, a peer-to-peer initiation instruction that comprises a data object that indicates at least one of (i) a characteristic or (ii) a condition associated with the data to be shared via the peer-to-peer connection, wherein the peer-to-peer connection is established based at least in part on the peer-to-peer initiation instruction.

11. A method, implemented at least in part by a group-based communication server of a group-based communication system, the method comprising:
receiving a peer-to-peer connection request associated with a first identifier for a first client device and a second identifier for a second client device;
comparing the first identifier and the second identifier to a group-based communication system validation registry that is maintained by the group-based communication system and that stores data associated with groups of users of the group-based communication system;
determining that the first identifier and the second identifier are both within a peer-to-peer group of the groups of users included within the data stored by the group-based communication system validation registry, wherein users included in the peer-to-peer group have been pre-authorized to establish peer-to-peer connections with one another; and
based at least in part on a determination that the peer-to-peer connection request is authorized based at least in part on the first identifier and the second identifier both being within the peer-to-peer group, causing establishment of a peer-to-peer connection between the second client device and the first client device for sharing data associated with the group-based communication system.

12. The method as claim 11 recites, wherein the first client device and the second client device are associated with a common local area connection, and wherein the peer-to-peer connection request is received in response to the first client device receiving a broadcast communication packet from the second client device via the common local area connection, wherein the broadcast communication packet identifies the second identifier.

13. The method as claim 11 recites, further comprising:
generating, based at least in part on receiving a token generation request from the second client device, a token;
storing the token in the group-based communication system validation registry, wherein the token is associated with the first identifier and the second identifier; and
sending the token to the first client device, wherein the peer-to-peer connection request is received in response to sending the token to the first client device.

14. The method as claim 11 recites, wherein determining whether the peer-to-peer connection request is authorized is based on one or more of:
a group identifier associated with the first identifier or the second identifier;
a group-based communication interface associated with the first identifier or the second identifier; or
a token, in the group-based communication system validation registry, associated with the first identifier or the second identifier.

15. The method as claim 11 recites, further comprising, based at least in part on the determination that the peer-to-peer connection request is authorized per the group-based communication system validation registry, transmitting, to the second client device, a peer-to-peer initiation instruction associated with a data object instructing the second client device to transmit all data received by the second client device and from the group-based communication server, that is associated with a group identifier with which the first identifier and the second identifier are associated, to the first client device.

16. The method as claim 11 recites, further comprising, based at least in part on the determination that the peer-to-peer connection request is authorized per the group-based communication system validation registry, transmitting, to the second client device, a peer-to-peer initiation instruction associated with a data object instructing the second client device to transmit a portion of data received by the second client device and from the group-based communication server, that is (i) associated with a group identifier with which the first identifier and the second identifier are associated, and (ii) is requested by the first client device, to the first client device.

17. The method as claim 11 recites, further comprising, based at least in part on the determination that the peer-to-peer connection request is authorized per the group-based communication system validation registry, transmitting, to the second client device, a peer-to-peer initiation instruction associated with a data object instructing the second client device to transmit all data received by the second client device and from the group-based communication server, that is associated with a group identifier with which the first identifier and the second identifier are associated, to the first client device in response to an indication that the first client device at least one of (i) lacks connection to the group-based communication server or (ii) is associated with a suboptimal connection to the group-based communication server.

18. One or more non-transitory computer-readable media storing instructions that, when executed by one or more processors of a group-based communication system, cause the group-based communication system to perform operations comprising:
receiving a peer-to-peer connection request associated with a first identifier for a first client device and a second identifier for a second client device;
comparing the first identifier and the second identifier to a group-based communication system validation registry that is maintained by the group-based communication system and that stores data associated with groups of users of the group-based communication system;
determining that the first identifier and the second identifier are both within a peer-to-peer group of the groups of users included within the data stored by the group-based communication system validation registry, wherein users included in the peer-to-peer group have been pre-authorized to establish peer-to-peer connections with one another; and based at least in part on a determination that the peer-to-peer connection request is authorized based at least in part on the first identifier and the second identifier both being within the peer-to-peer group, causing establishment of a peer-to-peer connection between the second client device and the first client device for sharing data associated with the group-based communication system.

19. The one or more non-transitory computer-readable media as claim 18 recites, wherein determining whether the peer-to-peer connection request is authorized is based on one or more of:
- a group identifier associated with the first identifier or the second identifier;
- a group-based communication interface associated with the first identifier or the second identifier; or
- a token, in the group-based communication system validation registry, associated with the first identifier or the second identifier.

20. The one or more non-transitory computer-readable media as claim 18 recites, the operations further comprising, based at least in part on the determination that the peer-to-peer connection request is authorized per the group-based communication system validation registry, transmitting, to the second client device, a peer-to-peer initiation instruction that comprises a data object that indicates at least one of (i) a characteristic or (ii) a condition associated with the data to be shared via the peer-to-peer connection, wherein the peer-to-peer connection is established based at least in part on the peer-to-peer initiation instruction.

* * * * *